(12) United States Patent
Hwang

(10) Patent No.: US 7,659,676 B2
(45) Date of Patent: Feb. 9, 2010

(54) LIGHTING SYSTEM USING GPS RECEIVER

(75) Inventor: Jun-dong Hwang, Seoul (KR)

(73) Assignee: Stwol Co. Ltd., Seoul (KR)

( * ) Notice: Subject to any disclaimer, the term of this patent is extended or adjusted under 35 U.S.C. 154(b) by 0 days.

(21) Appl. No.: 11/883,053

(22) PCT Filed: Mar. 15, 2005

(86) PCT No.: PCT/KR2005/000728

§ 371 (c)(1),
(2), (4) Date: Jun. 10, 2008

(87) PCT Pub. No.: WO2006/080603

PCT Pub. Date: Aug. 3, 2006

(65) Prior Publication Data

US 2008/0278100 A1    Nov. 13, 2008

(30) Foreign Application Priority Data

Jan. 26, 2005    (KR) .................. 10-2005-0007264

(51) Int. Cl.
*H05B 37/02*    (2006.01)
*G09F 9/33*    (2006.01)

(52) U.S. Cl. .................. 315/360; 315/361; 340/468; 340/815.45; 701/213

(58) Field of Classification Search .................. 315/291, 315/307, 318, 241 P, 308, 312, 218, 360, 315/361; 340/468, 815.45, 953, 982; 342/357.12, 342/362; 701/213
See application file for complete search history.

(56) References Cited

U.S. PATENT DOCUMENTS

| 5,852,790 | A  | * | 12/1998 | Hayes et al. | ................. 701/213 |
| 6,510,381 | B2 | * | 1/2003  | Grounds et al. | ............. 701/207 |
| 6,553,311 | B2 | * | 4/2003  | Ahearn et al. | ................ 701/213 |
| 6,992,991 | B2 | * | 1/2006  | Duske et al. | ................. 370/316 |
| 2008/0278100 | A1 | * | 11/2008 | Hwang | ....................... 315/360 |

FOREIGN PATENT DOCUMENTS

| JP | 4297881 | 10/1992 |
| WO | WO 9831201 | 7/1998 |

\* cited by examiner

*Primary Examiner*—Douglas W Owens
*Assistant Examiner*—Jimmy T Vu
(74) *Attorney, Agent, or Firm*—Jacobson Holman PLLC

(57) ABSTRACT

A lighting system using a GPS receiver is provided. The lighting system includes: a GPS receiver for calculating sunrise time and sunset time from an inputted GPS signal and outputting an on/off signal and a satellite detection indicating signal according to the calculated sunrise time and sunset time; a security light configured to be turned on/off in response to the on/off signal; and an LED configured to be turned on/off in response to the satellite detection indicating signal. Accordingly, the GPS receiver itself receives GPS satellite signal, sunrise time and sunset time are automatically calculated from the received position information and reception information by using a baseband processor, and a security light is turned on/off at the calculated sunrise and sunset time, so that the number of components is greatly reduced.

2 Claims, 3 Drawing Sheets

LIGHTING SYSTEM USING GPS RECEIVER

This is a national stage of PCT/KR05/000728 filed Mar. 15, 2005 and published in English.

TECHNICAL FIELD

The present invention relates to a lighting system using a GPS receiver, and more particularly, to a lighting system using GPS for turning on/off a security light according to sunrise time and sunset time, which are directly calculated in a baseband processor that receives information from GPS.

BACKGROUND ART

Security light is attached to electric poles located between buildings or alleys for the purpose of illumination and crime prevention. A flasher is installed in each security light.

A photoelectric control method and an electric control method are widely used to control a flasher of a security light.

The photoelectric control method uses a photodiode (photoelectric transformation device). The photoelectric control method uses a characteristic that a reverse current in P-N junction or contact between a rectifying metal and a semiconductor increases a photovoltaic effect due to illumination of light.

However, when a dark current is generated or it is a cloudy day or a lot of dust accumulates in the photodiode, power may be dissipated and persons may complain.

For these reasons, the photodiode has been replaced with an electric flasher.

The electric control method is designed to memorize a year's sunrise/sunset time of an installation region in a memory of one-chip controller and read month, day and time from a clock chip to turn on/off the light at a corresponding month, day and time.

However, an X-TAL oscillator used in the clock chip is not precise and is sensitive to environment and temperature change. Thus, the light may be turned on/off earlier or later.

In order to solve these problems, time signal is received from a satellite radio and a fixed time is recognized only when a signal is received within two seconds from the time signal. When noise is mis-recognized as the time signal and the set time is out of three or more seconds in the clock chip, the time signal from the satellite radio cannot be received. Accordingly, the time is set incorrectly due to the noise.

In order to solve this problem, a lighting system is disclosed in Korean Patent No. 0461047, filed by the present applicant.

The lighting system using GPS includes: a GPS receiver 10 for receiving GPS satellite signal; a controller 20 for receiving position information and time information from the GPS receiver 10 and calculating a position of the sum, sunrise time and sunset time by substituting the position information and the time information into a calculation equation; an input unit 40 for receiving time difference in the sunrise time and sunset time through an operator's key manipulation; and an output unit 50 for outputting a turn on/off indicating signal and a satellite detection indicating signal at the sunrise time and sunset time, which is calculated by the controller 20.

An overall operation of the lighting system constructed as above will now be described. First, the GPS satellite signal is received through the GPS receiver 10, and the position information and the time information are transmitted to the controller 20 through RS-232C communication interface.

The controller 20 calculates the sunrise time and the sunset time, based on the information received from the GPS receiver 10, by substituting the position of the sun, the sunrise time and the sunset time into the calculation equation. Meanwhile, the controller 20 controls the light to turn on/off according to the calculated sunrise time and sunset time. The controller 20 receives information, such as alternate turn-on based on time zones and latenight turn-off when crops grow based on regions, through the input unit 40, and performs the turn on/off operation.

That is, the GPS satellite signal is received, and the position information and the time information are substituted into the calculation equation to automatically calculate the sunrise time and the sunset time. Accordingly, the light can be automatically turned on/off at the sunrise and the sunset.

Referring to FIG. 2, the GPS receiver 10 includes: a low noise amplifier (LNA) 11 for amplifying RF signal received from a GPS satellite through an antenna ANT; an RF filter 12 for filtering the amplified RF signal; an RF front-end IC 13 for converting an output signal of the RF filter 12 into an IF signal; a baseband processor 14 for down-converting the IF signal into a baseband frequency; and a flash memory 15 for storing information necessary for the system.

In such a lighting system, the GPS receiver, the controller, the input unit and the output unit are separately provided. Therefore, a lot of components are used, resulting in an increase of a manufacturing cost.

DISCLOSURE OF INVENTION

Technical Problem

An object of the present invention is to provide a lighting system using GPS, capable of reducing a manufacturing cost. In the lighting system, a GPS receiver itself receives GPS satellite signal, sunrise time and sunset time are automatically calculated from the received position information and reception information by using a baseband processor, and a security light is turned on/off at the calculated sunrise and sunset time. Accordingly, the number of components is greatly reduced.

Another object of the present invention is to provide a lighting system using a GPS receiver, in which an artificial intelligent lighting system is installed at a low cost and a security light is automatically turned on/off accurately at sunrise time and sunset time regardless of installation regions.

A further object of the present invention is to provide a lighting system using a GPS receiver, in which there is no power loss caused by malfunctions caused by thermal elements such as a photoelectric flasher, dielectric defect and environment. Also, time offset in the electric flasher does not occur, thereby preventing erroneous operations, that is, turning off the light at undesired time and turning on the light at desired time.

Technical Solution

According to an aspect of the present invention, a lighting system using GPS includes: a GPS receiver for calculating sunrise time and sunset time from an inputted GPS signal and outputting an on/off signal and a satellite detection indicating signal according to the calculated sunrise time and sunset time; a security light configured to be turned on/off in response to the on/off signal; and an LED configured to be turned on/off in response to the satellite detection indicating signal.

The GPS receiver includes: an LNA for amplifying an RF signal received from a GPS satellite through an antenna; an RF filter for filtering the amplified RF signal outputted from the LNA; an RF front-end IC for converting an output signal of the RF filter into an IF signal; and a baseband processor for down-converting the IF signal into a baseband signal to extract the GPS signal, calculating the sunrise time and the sunset time by using the extracted GPS signal, and outputting the on/off signal and the satellite detection indicating signal at the calculated sunrise time and the sunset time.

The baseband processor includes: a flash memory for storing information necessary for the system; a GPS signal processing unit for mixing the IF frequency with an oscillation signal to generate the baseband signal, and extracting the GPS signal; a time calculating unit for calculating the sunrise time and the sunset time by using the GPS signal outputted from the GPS signal processing unit; and an output controlling unit for outputting the on/off signal and the satellite detection indicating signal through I/O port at the calculated sunrise time and the sunset time.

The lighting system of claim 3, wherein the time calculating unit is a program stored in the flash memory.

Advantageous Effects

A lighting system according to the present invention can reduce a manufacturing cost. In the lighting system, a GPS receiver itself receives GPS satellite signal, sunrise time and sunset time are automatically calculated from the received position information and reception information by using a baseband processor, and a security light is turned on/off at the calculated sunrise and sunset time. Accordingly, the number of components is greatly reduced.

Also, an artificial intelligent lighting system is installed at a low cost and a security light is automatically turned on/off accurately at sunrise time and sunset time regardless of installation regions.

In addition, there is no power loss caused by malfunctions caused by thermal elements such as a photoelectric flasher, dielectric defect and environment. Further, time offset in the electric flasher does not occur, thereby preventing erroneous operations, that is, turning off the light at undesired time and turning on the light at desired time.

BEST MODE FOR CARRYING OUT THE INVENTION

Hereinafter, a lighting system using a GPS receiver according to the present invention will be described in detail with reference to the accompanying drawings.

Figure 1:
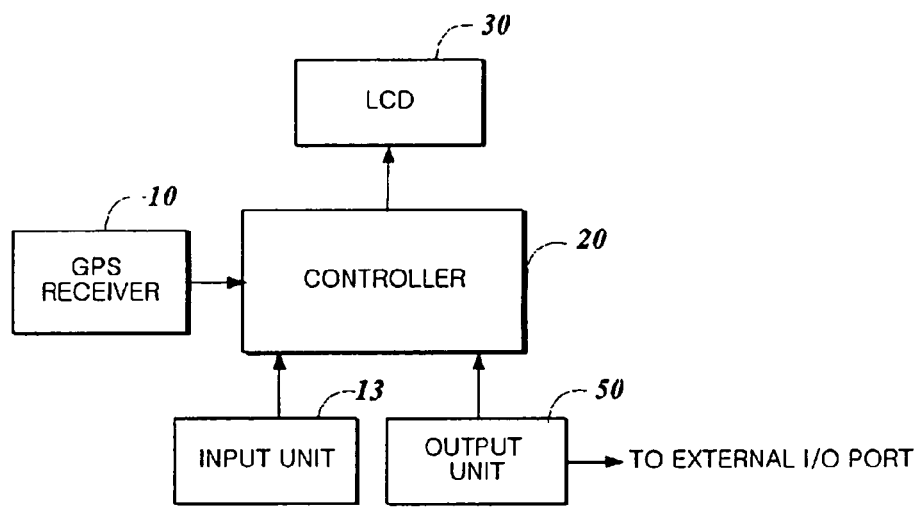
FIG. 1 is a block diagram of a conventional lighting system using GPS.
Figure 2:
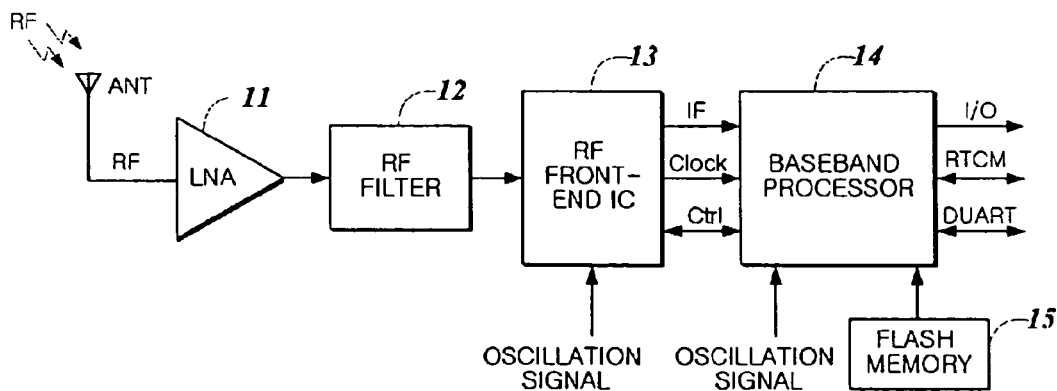
FIG. 2 is a block diagram of a GPS receiver shown in FIG. 1.
Figure 3:
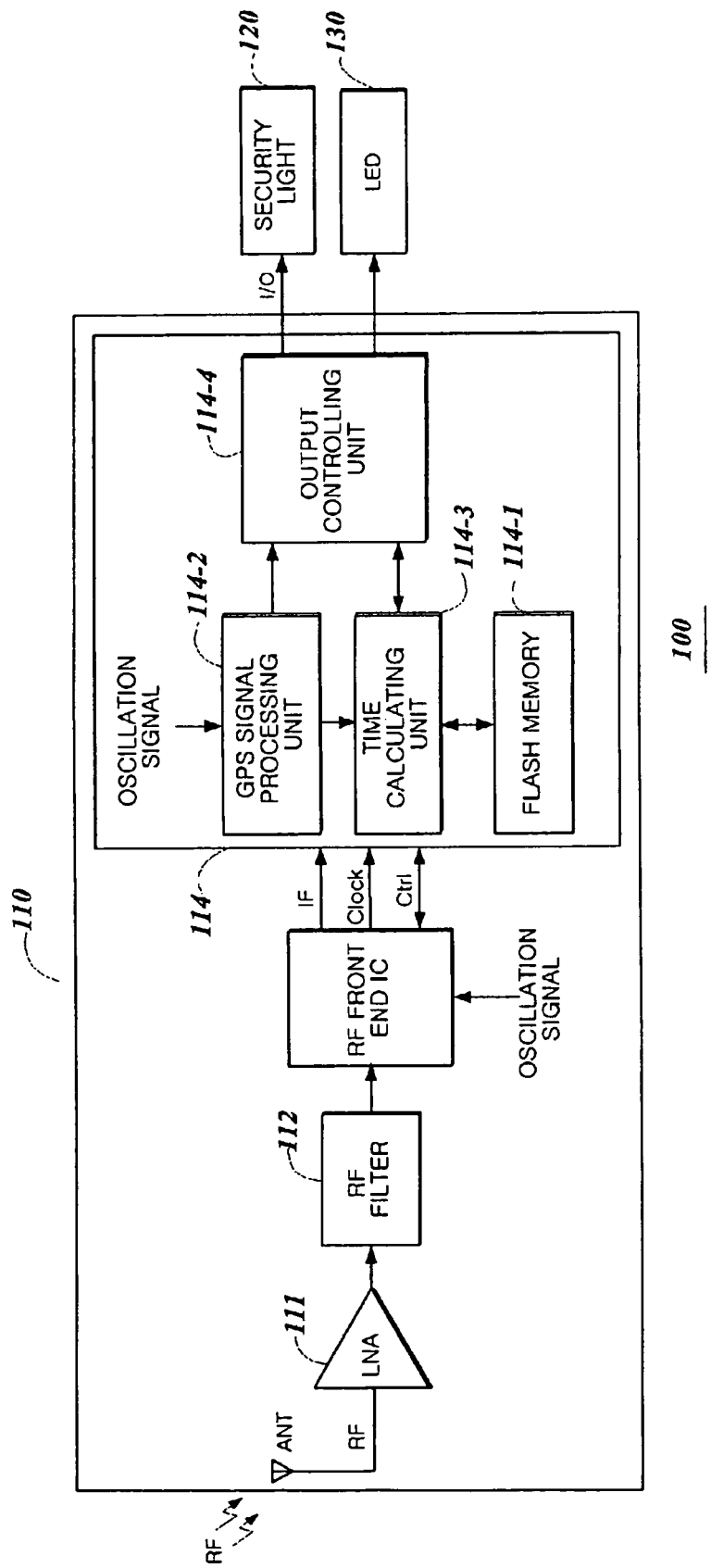
FIG. 3 is a block diagram of a lighting system using a GPS receiver according to an embodiment of the present invention.

FIG. 3 is a block diagram of a lighting system using a GPS receiver according to an embodiment of the present invention.

Referring to FIG. 3, a lighting system 100 includes a GPS receiver 110, a security light 120, and an LED 130.

Also, the GPS receiver 110 includes an LNA 111, an RF filter 112, an RF front-end IC 113, and a baseband processor 114.

The LNA 111 amplifies an RF signal received from a GPS satellite through an antenna ANT.

The RF filter 112 filters the RF signal outputted from the LNA 111. A high pass filter, a band pass filter and a low pass filter can be used as the RF filter 112.

The RF front-end IC 113 converts an output signal of the RF filter 112 into an IF signal.

The baseband processor 114 includes a flash memory 114-1, a GPS signal processing unit 114-2, a time calculating unit 114-3, an output controlling unit 114-4, and an I/O port 114-5.

The flash memory 114-1 stores a variety of information necessary for the system. Specifically, the flash memory 114-1 is integrally formed within the baseband processor 114.

The GPS signal processing unit 114-2 mixes the IF frequency with an oscillation signal to convert it into a baseband signal, and extracts a GPS signal.

The time calculating unit 114-3 calculates the sunrise time and the sunset time by using the GPS signal outputted from the GPS signal processing unit 114-2. At this point, the time calculating unit 114-3 is a program that inserts the GPS signal into the equation of calculating the sunrise time and the sunset time by using SOFTWARE DEVELOPMENT KIT and calculates the sunrise time and the sunset time by substituting the position information, altitude and the time information, which are contained in the GPS signal, and then stores them into the flash memory 114-1.

The output controlling unit 114-4 outputs on/off signal and a satellite detection indicating signal of the GPS signal processing unit 114-2 through the I/O port 114-5 at the calculated sunrise time and sunset time. Here, the output controlling unit 114-4 operates the LED 130 according to the satellite detection indicating signal. If the satellite is detected, the light is turned on at every time interval of 1 second. On the contrary, if the satellite is not detected, the light is turned on or off.

The I/O port 114-5 is a signal I/O port.

The security light 120 is turned on/off in response to the on/off signal outputted from the output controlling unit 114-4.

The LED 130 is turned on/off in response to the satellite detection indicating signal outputted from the output controlling unit 114-4. In the satellite detection indicating signal, an accurate information can be received only when four or more satellites are detected. Therefore, the satellite detection indicating signal is used to check whether the satellite reception is well done.

An operation of the lighting system according to the present invention will now be described with reference to FIGS. 3 and 4.

Figure 4:
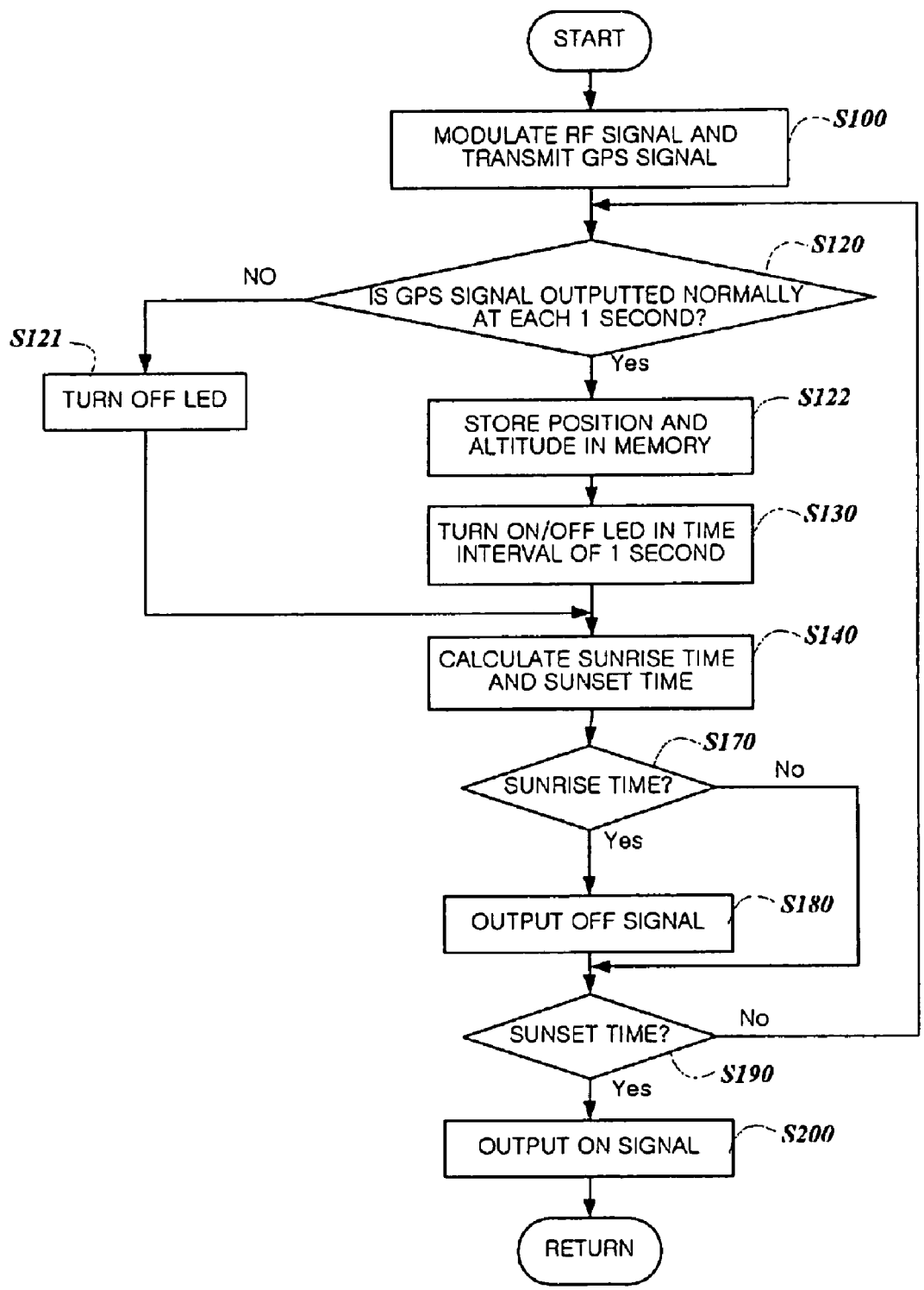
FIG. 4 is a flowchart illustrating an operation of a lighting system using a GPS receiver according to an embodiment of the present invention.

FIG. 4 is a flowchart illustrating an operation of the lighting system according to an embodiment of the present invention.

The GPS signal processing unit 114-2 of the baseband processor 114 modulates the RF signal received from the GPS satellite and transmits the GPS signal, including the position information, the time information and the number of the detected satellites, to the time calculating unit 114-3 (S100). Since the GPS signal is received through a Stand-alone GPS having a 25-m position accuracy, four or more GPS satellite signal is received through only one GPS receiver 110 and has the user's position and altitude and the accurate time function at any places.

The GPS signal processing unit 114-2 transmits the position information and altitude, the time information, and the number of the detected satellites to the time calculating unit 114-3 in time unit of 1 second.

Then, the output controlling unit 114-4 checks whether the GPS signal is outputted, that is, whether the GPS satellite is correctly detected at each 1 second (S120). The position and altitude are stored in the flash memory 114-1 (S122) and the LED is turned on/off in time interval of 1 second (S130). If the GPS satellite is not detected correctly at each 1 second, the output controlling unit 114-4 turns on or off the LED (S121).

Meanwhile, if the GPS signal is outputted from the GPS signal processing unit 114-2, the time calculating unit 114-3 substitutes the GPS signal into a following equation to calculate the sunrise time and the sunset time (S140).

Even when the GPS signal is not outputted from the GPS signal processing unit 114-2, the position and altitude has been stored and time inside the program itself goes by, so that there is no problem in calculating the sunrise time and the sunset time.

The equation of calculating the sunrise time and the sunset time is give by $$\text{sunrise} = 720 + 4(\text{longitude} - ha) - \text{eqtime} \quad \text{(Equation 1)}$$

where "sunrise" is a sunrise/sunset time, "longitude" is a longitude, "ha" is a value calculated by a following equation 2, and "eqitime" is a value calculated by equation 3 below.

$$ha = \pm \arccos\left[\frac{\cos(tl)}{\cos(lat)\cos(decl)} - \tan(lat)\tan(decl)\right] \quad \text{(Equation 2)}$$

where "+arccos" is used to calculate the sunrise time, and "−arccos" is used to calculate the sunset time.

"tl" is a value calculated by equation 6 or 7 below.

"lat" is a latitude, and "decl" is a value calculated by equation 4 below.

$$\text{eqtime} = 229.18(0.000075 + 0.001868 \cos \gamma - 0.032077 \sin \gamma - 0.014615 \cos 2\gamma - 0.040849 \sin 2\gamma) \quad \text{(Equation 3)}$$

where "γ" is calculated by equation 5 below.

$$decl = 0.006918 - 0.39912\cos\gamma - 0.070257\sin\gamma - 0.006758\cos2\gamma - 0.000907\sin2\gamma - 0.002697\cos3\gamma - 0.00148\sin3\gamma \quad \text{(Equation 4)}$$

$$\gamma = \frac{2\pi}{365} \times \left(\text{day of year} - 1 + \frac{\text{hour} - 12}{24}\right) \quad \text{(Equation 5)}$$

$$tl = 90 + (50 + 2.12 * \sqrt{(al)})/60 \quad \text{(Equation 6)}$$

where "al" is an above sea level. The sunset time is calculated using the above equation.

$$tl = ht + 2.12 * \sqrt{(al)/60} \quad \text{(Equation 7)}$$

where "ht" is 96 in the calculation of civil twilight, 102 in the calculation of nautical twilight, and 108 in the calculation of astronomical twilight.

The output controlling unit 114-4 checks whether it is the sunrise time (S170). If it is the sunrise time, the output controlling unit 114-4 outputs the off signal to turn off the security light (S180). The output controlling unit 114-4 checks whether it is the sunset time (S190). If it is the sunset time, the output controlling unit 114-4 outputs the on signal to turn on the security light (S200).

As described above, the GPS satellite signal is received and the received information is substituted into the calculation equation to automatically calculate the sunrise time and the sunset time. However, the present invention is not limited to that.

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A lighting system using GPS, the lighting system comprising:
a GPS receiver for calculating sunrise time and sunset time from an inputted GPS signal and outputting an on/off signal and a satellite detection indicating signal according to the calculated sunrise time and sunset time;
a security light configured to be turned on/off in response to the on/off signal; and
an LED configured to be turned on/off in response to the satellite detection indicating signal, wherein the GPS receiver includes
an antenna,
an LNA for amplifying an RF signal received from a GPS satellite through the antenna,
an RF filter for filtering the amplified RF signal outputted from the LNA,
an RF front-end IC for converting an output signal of the RF filter into an IF signal, and
a baseband processor for down-converting the IF signal into a baseband signal to extract the GPS signal, calculating the sunrise time and the sunset time by using the extracted GPS signal, and outputting the on/off signal and the satellite detection indicating signal at the calculated sunrise time and the sunset time and wherein the baseband processor includes
a flash memory for storing information necessary for the lighting system,
a GPS signal processing unit for mixing the IF frequency with an oscillation signal to generate the baseband signal, and extracting the GPS signal,
a time calculating unit for calculating the sunrise time and the sunset time by using the GPS signal outputted from the GPS signal processing unit, and
an output controlling unit for outputting the on/off signal and the satellite detection indicating signal through an I/O port at the calculated sunrise time and the sunset time.

2. The lighting system of claim 1, wherein the time calculating unit is a program stored in the flash memory.

\* \* \* \* \*